United States Patent [19]

Shimizu et al.

[11] 4,089,701

[45] May 16, 1978

[54] PROCESS FOR SOLIDIFYING MOLASSES

[75] Inventors: Junichi Shimizu; Tatsuya Iwakura, both of Yokohama, Japan

[73] Assignee: Mitsui Sugar Co., Ltd., Tokyo, Japan

[21] Appl. No.: 766,542

[22] Filed: Feb. 7, 1977

[30] Foreign Application Priority Data

Jul. 12, 1976  Japan ................................. 51/81923
Feb. 7, 1976  Japan ................................. 51/1246

[51] Int. Cl.² .......................... C13F 3/00; A23K 1/02
[52] U.S. Cl. .................................... 127/61; 127/29; 127/58; 127/62; 159/47 R; 426/658; 426/807
[58] Field of Search ............... 127/58, 61; 159/47 R; 426/658, 807

[56] References Cited

U.S. PATENT DOCUMENTS

| 1,983,434 | 12/1934 | Black | 159/4 C |
|---|---|---|---|
| 3,698,911 | 10/1972 | Pellegrini | 127/58 X |
| 3,880,668 | 4/1975 | Miller | 127/58 |
| 3,893,842 | 7/1975 | Glabe | 127/58 X |
| 4,013,482 | 3/1977 | Jaconelli | 127/58 X |

*Primary Examiner*—Sidney Marantz
*Attorney, Agent, or Firm*—Kane, Dalsimer, Kane, Sullivan and Kurucz

[57] ABSTRACT

Homogeneous, solidified molasses can be successfully obtained by concentrating under heat molasses, oils and fats and/or higher fatty acid esters at a temperature of between 110° and 175° C in the presence of alkali in such an amount as to regulate the pH value of the molasses in the range of between 8 and 12.

11 Claims, No Drawings

PROCESS FOR SOLIDIFYING MOLASSES

BACKGROUND OF THE INVENTION

1. Field of the Invention

This invention relates to a process for solidifying molasses such as cane sugar molasses, beet sugar molasses, refinery sugar molasses, etc. and more particularly it relates to a process for solidifying molasses in a homogeneous form, which comprises, concentrating a mixture of molasses, oils and fats and/or esters of higher fatty acids by heating at a temperature between 110° and 175° C in the presence of alkali of such an amount as to regulate the pH of the molasses in a value of between 8 and 12.

2. Brief Description of the Prior Art

Molasses is a blackish brown, viscous liquid containing sugars and various organic and inorganic substances which will inhibit the crystallizing out of the sugars. Exemplary of molasses are cane sugar molasses obtained in the cane sugar manufacturing industry, beet sugar molasses obtained in the beet sugar manufacturing industry, refinery sugar molasses obtained in the refinery sugar manufacturing industry, etc. molasses is widely used as an alcoholic material as well as for yeast fermentation, feed for cattle, material for industries and foods and so on.

Since, however, these molasses are liquid state and contain water in high level such as 20%, there are difficulties in transportation, also in the case where molasses is utilized in more than a certain amount to compound a feed, it may exude out and deteriorate the product. Many attempts have been made to avoid these difficulties, however, these attempts have not yet been practiced in a large scale operation, because the products are highly hygroscopic and also the substantial value obtained by the said treatment is relatively low when the expense thereof is considered.

SUMMARY OF THE INVENTION

The invention comprises a method of solidifying molasses which comprises; providing a mixture of molasses and a composition selected from oils, fats and esters of higher fatty acids; and concentrating the mixture at a temperature of between 110° and 175° C. in the presence of sufficient alkali to regulate the pH of the mixture to a value in the range of 8 to 12.

The concentration step under heating may be carried out in two steps, that is, at first concentrating under heat at a temperature of 130° C under a reduced pressure, then secondly heat at a temperature of between 120° and 160° C under atmospheric or a reduced pressure. However, concentrating may also be attained in a one step procedure by heating under stirring at a temperature of between 110 and 175° C.

DETAILED DESCRIPTION OF THE INVENTION

According to the present invention homogeneous, solidified molasses including paste form molasses can be obtained by the reaction of molasses with oils, fats and/or esters of higher fatty acids. Since water is removed from the product obtained, it is almost non-hygroscopic and has a very long period of storage life. Since the product has a solid state, it is very convenient for transportation and preservation and so the process according to the invention is quite preferable as and advantageous method for processing of molasses. The product is suitable as a cattle feed of higher calorie, especially as a component for easy digestable and absorbable compounded feeds and so the economical merit of the present invention is significant.

In the present invention any molasses can be applied for example cane sugar molasses, beet sugar molasses, refinery sugar molasses, etc., however, beet sugar molasses is preferable.

As for oils and fats used in the present invention, animal fats and oils, such as beef tallow, lard, fish oil, etc. as well as vegetable oils and fats, such as coconut oil, cotton seed oil, soya been oil, tall oil, etc. and also hardened and semihardened oils of these may be used.

Examples of suitable higher fatty acid esters used in the present invention include those methyl or ethyl esters of saturated or unsaturated, straight chain fatty acids having carbon atoms from 8 to 22, especially from 14 to 20 as well as monoglyceride or diglyceride such as monostearine or distearine, etc.

The addition of alkali according to the process of the present invention is to cause a catalytic action together with inorganic substances included in molasses to give a homogeneous solid by the reaction of molasses with oils and fats and/or esters of higher fatty acids. Exemplary of alkalis that can be added in the present process are potassium carbonate, sodium carbonate, sodium hydroxide, potassium hydroxide, etc. or a mixture of two or more of these alkalis. Amount of alkali to be added should be adjusted so as to regulate the pH value of the molasses mixture in a range of between 8 and 12. Out of the range of said pH value, the reaction will scarcely proceed and there can not be obtained a homogeneous, solidified product. Though it was considered that impurities contained in molasses may inhibit the said catalytic reaction; these impurities do not inhibit the reaction but instead assist the reaction.

The temperature to be used according to the invention is in the range of between 110° and 175° C. If a temperature of below 110° C is used the reaction mixture is divided into two layers to cause the termination of the reaction and if a temperature of above 175° C is used, there occurs undesirable decompositions and colorization.

Molasses contains organic and inorganic crystalline substances and colloidal substances as said above which will inhibit the crystallization of sugars in molasses. Thus sucrose is incapable of crystallizing out from molasses. However, when molasses is concentrated under heating to give a suspension, molasses as well as oils and fats and/or esters of higher fatty acids are present in a state of emulsion in the liquid phase to facilitate the reaction between molasses and oils and/or esters of higher fatty acids fats. According to the previous techniques when a molasses containing a small amount of water is heated at the temperature of from 100° C up to above 120° C, it may be colored and decomposed excessively, whereas according to the present invention it is possible to reduce these undesirable phenomena.

When a part of the product according to the invention is added to the starting materials to be treated according to the invention, it serves as a dispersing agent and a homogeneous, solidified product may be obtained.

The solidified molasses obtained according to the invention have emulsifying, insolubilizing and wetting powers and can be utilized in foods, medicines and cosmetic industries.

As the result of the chromatographic analysis of the homogeneous solidified molasses according to the invention, there can be detected sugars such as sucrose, raffinose, reducing sugar, oils and fats, glycerides such as monoglycerides, diglycerides, etc. and fatty acid esters of sugars as contained in molasses.

The present invention is further illustrated by the following examples.

EXAMPLE 1

100.5 g of beet sugar molasses (83.5% solid, 16.5% water, 46.8% sucrose, 4.2% raffinose, 0.28% reducing sugar, 8% ash, Stammer color index 137) is added with 125 g of beef tallow, 10.0 g of monostearine and 16 g of potassium carbonate (by the addition of potassium carbonate the pH value of molasses showed 10.8) and then the obtained mixture is concentrated under heating in a rotary evaporator at a reduced pressure by heating slowly from 100° up to 130° C within 2 hours and 40 minutes. The obtained residue is heated in a mixture equipped with a screw type impeller at 150° C for 45 minutes and then 160° C for 1 hour and 40 minutes under normal pressure at 400 – 800 r.p.m. By this treatment the molasses which initially separated into two layers have been homogenized and 230 g of homogeneous, solidified molasses in a paste form were obtained.

EXAMPLE 2

100 g of beet sugar molasses as used in Example 1 is added with 15 g of potassium carbonate (by the addition of these alkalis the pH value of the molasses raised to 11.5), 125 g of beef tallow and the mixture is concentrated under reduced pressure in a rotary evaporator by slow heating from 90° up to 120° C within 2 hours and 40 minutes. Then the mixture is heated at a temperature between 130° and 150° C for 2 hours and then at 160° C for 2 hours under stirring in a mixer equipped with a screw type impeller under normal pressure and 230 g of solidified molasses were obtained.

EXAMPLE 3

A mixture of 100 g of beet sugar molasses and used in Example 1, 125 g of crude methyl ester of fatty acid (numbers of carbon atoms in fatty acid is distributed in a range of from 14 to 18), 16 g of potassium carbonate (by the addition of potassium carbonate the pH value of the molasses showed 10.8) and 20 g of the product obtained by the procedure described in Example 2 is concentrated under reduced pressure in a rotary evaporator by slow heating from 90° C up to 120° C within 3 hours and 40 minutes. The mixture is then heated slowly from 120° C up to 150° C within 4 hours and 15 minutes under normal pressure in a mixer equipped with a screw type stirrer at 400 – 800 r.p.m. and 230 g of solidified molasses were obtained.

EXAMPLE 4

100 g of refinery molasses (analysis: 83.0% solid matter, 18.8% reducing sugars, 33.1% sucrose, 16.5% organic matters, 10.5% ash, 11.1% $H_2O$), 50 g of crude methyl ester of fatty acid (having carbon atoms distributed between 14 and 18), 35 g of monoglyceride of stearic acid and 20 g of potassium carbonate (after addition of potassium carbonate pH value of the molasses showed 9) are introduced into an egg plant type flask, the flask is immersed in an oil bath of 110° C and the contents of the flask are concentrated by heating for 1 hour under an atmospheric pressure under stirring by means of screw type impeller at 400 – 800 r.p.m., then heated at the temperature of the oil bath of 125° C for 1 hour and further heated at 130° C for 30 minutes and then 148° C for 30 minutes. Initially separated reaction mixture in two layers consisting of a part of molasses and a part of methyl ester of fatty acids has been homogenized. Thus, 171 g of solidified molasses were obtained.

EXAMPLE 5

100 g of beet sugar molasses (analysis: 83.0% solid matter, 8.6% reducing sugar, 45.6% sucrose, 17.0% $H_2O$, 7.6% raffinose, 7.6% ash, 13.6% organic matters), 50 g of crude methyl ester of fatty acids as used in Example 4, 25 g of monoglyceride of steric acid and 20 g of potassium carbonate (by the addition of potassium carbonate the pH value of the molasses showed 11) are introduced into an egg plant type flask and concentrated under heating as the same conditions as described in Example 4. The reaction mixture initially separated in two layers consisting of a part of methyl ester of fatty acids and a part of molasses has been homogenized. Thus, 162 g of solidified molasses were obtained.

EXAMPLE 6

100 g of beet sugar molasses (analysis: 83.5% solid matter, 0.28% reducing sugar, 46.8% sucrose, 16.5% water, 4.2% raffinose, 3% ash, 24.2% organic matters), 50 g of crude methylester of fatty acid as used in Example 4, 25 g monoglyceride of stearic acid, and 20 g of potassium carbonate (after addition pH value of molasses showed 11) are introduced into an egg plant type flask and concentrated under heating as the same conditions as described in Example 4. Thus, 165 g of solidified molasses were obtained.

EXAMPLE 7

100 g of refinery molasses as used in Example 4, 50 g of crude methylester of fatty acid, 50 g of the product obtained according to the procedure of Example 4 and 10 g of potassium carbonate is introduced into an egg plant type flask and concentrated under heating by immersing the flask in an oil bath of 125° C and then heated for 30 minutes at 130° C and further for 30 minutes at 140° C. Thus, 180 g of solidified molasses were obtained.

EXAMPLE 8

100 g of beet sugar molasses as used in Example 6, 125 g of beef tallow, 25 g of monoglyceride of stearic acid and 16 g of potassium carbonate (after addition of potassium carbonate pH value of molasses showed 10.8) are introduced into an egg plant type flask and heated by slow heating from 110° C up to 150° C within 4 hours in an oil bath under normal pressure and stirring by means of a screw type impeller at 400 – 800 r.p.m. Thus, 240 g of solidified molasses were obtained.

EXAMPLE 9

100 g of beet sugar molasses as used in Example 6, 50 g of the product obtained by the procedure of Example 8 10 g of sodium carbonate are introduced into an egg plant type flask and heated under the same conditions as described in Example 8. Thus, 260 g of solidified molasses were obtained.

EXAMPLE 10

100 g of beet sugar molasses as used in Example 5, 50 g of methyl stearate, 25 g monoglyceride of stearic acid and 20 g of potassium carbonate is introduced into an egg plant type flask and concentrated under heating by immersing the flask in an oil bath of 110° C under normal pressure and stirring by means of a screw type impeller at 400 – 800 r.p.m. and then at 125° C for 1 hour and further at 138° for 30 minutes. Thus, 167 g of solidified molasses were obtained.

We claim:

1. A process for solidifying molasses which comprises; providing a mixture of molasses and a composition selected from oils, fats and esters of higher fatty acids; and concentrating said mixture at a temperature of between 110° and 175° C in the presence of sufficient alkali to regulate the ph value of the mixture in the range of between 8 and 12.

2. A process according to claim 1, wherein said concentrating is carried out by heating said mixture first at a temperature of between 80° and 130° C. under reduced pressure and then heating at a temperature of between 120° and 160° C.

3. A process according to claim 1, wherein the provided mixture includes solidified molasses previously prepared by the process of claim 1.

4. A process for solidifying of molasses according to claim 1, in which as molasses beet sugar molasses is used.

5. A process for solidifying of molasses according to claim 1, in which as said molasses cane sugar molasses is used.

6. A process for solidifying of molasses according to claim 1, in which as said molasses refinery sugar molasses is used.

7. A process according to claim 1 wherein said composition selected is an oil or fat selected from beef tallow, lard, fish oil, coconut oil, cotton seed oil, soya bean oil, tall oil and hardened and semi-hardened oils of the aforementioned.

8. The process of claim 1 wherein said composition selected is the methyl or ethyl ester of a saturated or unsaturated straight chain fatty acid having 8 to 22 carbon atoms.

9. The process of claim 8 wherein said fatty acid has 14 to 20 carbon atoms.

10. The process of claim 1 wherein said composition is a mono- or diglyceride.

11. The process of claim 10 wherein said composition is selected from monostearine and distearine.

* * * * *